United States Patent [19]
Vandenbroucke

[11] Patent Number: 4,774,825
[45] Date of Patent: Oct. 4, 1988

[54] METHOD FOR CLADDING A WIRE-SHAPED STEEL ELEMENT WITH AN ALUMINUM COATING, AS WELL AS ALUMINUM-COATED WIRE-SHAPED STEEL ELEMENT

[75] Inventor: Gilbert Vandenbroucke, Zwevegem, Belgium

[73] Assignee: N.V. Bekaert S.A., Zwevegem, Belgium

[21] Appl. No.: 906,682

[22] Filed: Sep. 11, 1986

Related U.S. Application Data

[62] Division of Ser. No. 795,931, Nov. 7, 1985, abandoned.

[30] Foreign Application Priority Data

Dec. 10, 1984 [NL] Netherlands ............... 8403753

[51] Int. Cl.⁴ ............................................. B21C 23/24
[52] U.S. Cl. ................................... 72/47; 72/268
[58] Field of Search ................ 72/47, 258, 262, 268

[56] References Cited

U.S. PATENT DOCUMENTS

| | | | |
|---|---|---|---|
| 2,320,801 | 6/1943 | Simons | 72/268 |
| 3,137,389 | 6/1964 | De Buigne | 72/268 |
| 3,306,088 | 2/1967 | Adler | 72/47 |
| 3,438,754 | 4/1969 | Shepard et al. | 428/650 |
| 3,616,301 | 10/1971 | Miyata et al. | 428/650 |
| 3,652,321 | 3/1972 | Hood | 428/650 |
| 3,993,238 | 11/1976 | Brook et al. | 228/198 |
| 4,257,549 | 3/1981 | Bricmont | 428/659 |

FOREIGN PATENT DOCUMENTS

| | | |
|---|---|---|
| 2413899 | 9/1975 | Fed. Rep. of Germany . |
| 125788 | 11/1984 | European Pat. Off. . |
| 430 | 1/1965 | Japan ............................ 72/47 |

Primary Examiner—Lowell A. Larson
Attorney, Agent, or Firm—Solon B. Kemon

[57] ABSTRACT

This invention relates to a method for cladding a wire-shaped steel element (1) with an aluminium coating layer (3) by passing the steel wire (1) through an extrusion orifice (8), whereby plastified aluminium is fed through a closed feed channel (7) preceding the orifice (8) and is applied under pressure on the wire-shaped steel element (1) in the orifice (8) for forming the coating (3). According to the invention, the steel wire (1) is provided with a corrosion-resistant layer (2) with a thickness of 1 to 25 micron, which layer (2) has a lower melting temperature than the melting temperature of the aluminium to be applied and whereby during the coating process the temperature of the protective layer (2) which comes in contact with the aluminium remains lower than the melting temperature of the layer (2).

This invention also relates to coated steel wires according to the invention.

6 Claims, 2 Drawing Sheets

U.S. Patent  Oct. 4, 1988  Sheet 1 of 2  4,774,825
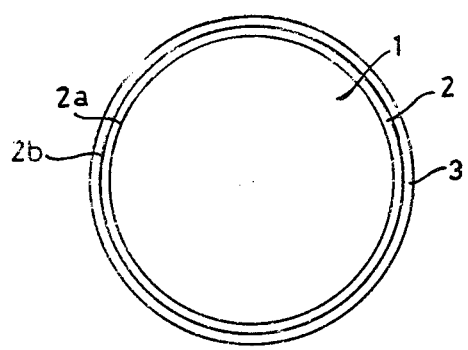
FIG:1.
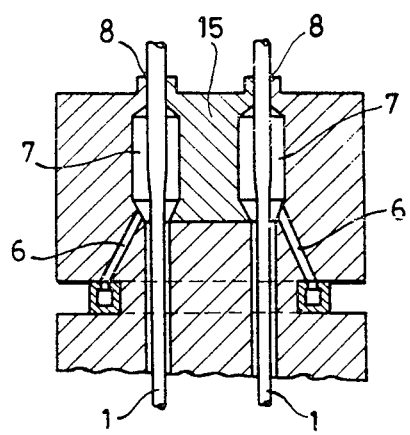
FIG:3.

U.S. Patent Oct. 4, 1988 Sheet 2 of 2 4,774,825
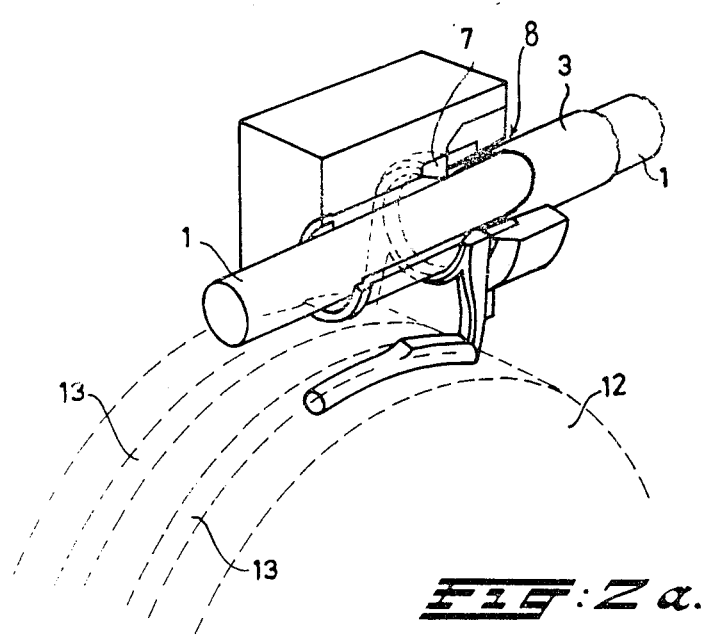
FIG:2a.
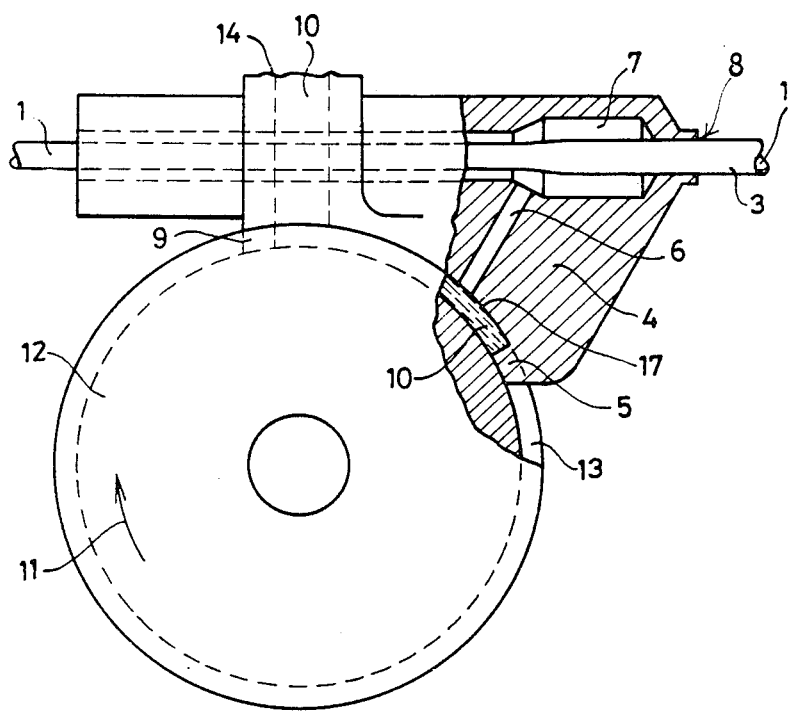
FIG:2.

METHOD FOR CLADDING A WIRE-SHAPED STEEL ELEMENT WITH AN ALUMINUM COATING, AS WELL AS ALUMINUM-COATED WIRE-SHAPED STEEL ELEMENT

This application is a division of application Ser. No. 795,931, filed Nov. 7, 1985, now abandoned.

The invention relates to a method for cladding a wire-shaped steel element with aluminium coating by passing the steel wire through an extrusion orifice, and plastified aluminium is supplied through a closed feed channel preceding the extrusion orifice and whereby in the extrusion orifice the plastified aluminium is applied under pressure on the wire-shaped steel element so as to form an aluminium coating layer.

Such a method for coating a wire-shaped steel element with an aluminium coating layer is already known.

This known method has the disadvantage that either the adhesion of the aluminium coating layer to the wire-shaped steel element is often inadequate, or that it is impossible to apply an aluminium coating layer with a sufficiently uniform thickness on the wire-shaped steel element. This, however, is of great importance when such aluminium-coated wire-shaped steel elements are to be used for conduction of current or for reinforcement of plastic or elastomer objects, in particular high-pressure hoses, possibly after the coated steel elements have been drawn to wire-shaped elements with the desired thickness.

It is an object of the invention to provide a method whereby these disadvantages are eliminated and whereby especially a wire-shaped steel element can be provided with a very well adhering aluminium coating layer of very uniform thickness.

According to the invention this object is obtained by using a wire-shaped steel element provided with a layer that protects the steel against corrosion and which has a thickness of 1 to 25 micron, the melting temperature of the protective layer being lower than the melting temperature of the aluminium to be applied and whereby, during the coating process, the temperature of the protective layer, which comes into contact with the plastified aluminium, remains below the melting point of the protective layer.

By use of such a wire-shaped steel element coated with a protective layer, one obtains, according to the method of the invention, a good moistening of this layer by the plastified aluminium as well as a diffusion of the protective layer both in the steel element and in the applied aluminium coating layer so that an optimal adhesion is achieved.

Moreover, an important advantage is that under the circumstances of the method according to the invention, the protective layer is fully preserved during the cladding process and does not dissolve into the plastified aluminium, even when the latter has a temperature exceeding the melting temperature of the protective layer. In that case, the temperature of the protective layer is maintained below the melting temperature of said layer by regulating the forward speed of the wire-shaped steel element, the temperature of the wire-shaped steel element and suchlike.

Finally, the presence of the protective layer on the wire-shaped steel element prevents the formation of corrosion that would affect the adhesion of the aluminium.

The temperature of the plastified aluminium is effectively between 400° and 420° C., but in general it is situated between 380° C. and a temperature below the melting point of the aluminium used. It is particularly advantageous that the protective layer, which effectively consists of zinc, cadmium and/or tin, has a thickness of 2 to 5 micron since with the application of such a layer optimal adhesion of the aluminium to the wire-shaped steel element is obtained.

Although the protective layer can be applied also by means of a liquid bath or by means of evaporation; it is recommendable to apply the above-mentioned thin protective layer electrolytically or without the use of electric current.

By using the said protective layer, it is also possible to move the wire-shaped steel element forward at a speed between 50 and 400 m/min, preferably between 100 to 200 m/min, during the aluminium-coating method. Such a high speed of the wire-shaped steel element during the aluminium-cladding method is not possible without the application of a protective layer having said thickness.

The aluminium coating layer has effectively a thickness of between 0.02 and 3 mm, and preferably between 0.1 and 1.5 mm.

During the cladding method, the temperature is advantageously of such a level that the metal or the alloy of the protective layer diffuses directly into the steel and the aluminium, e.g. that aluminium temperature is appropriately 380°–425° C., and in particular 420° C., during the application of this coating.

The wire-shaped steel elements used preferably have a thickness of 1 to 8 mm.

When using thin wire-shaped steel elements, i.e. wire-shaped steel elements with a thickness between 1 and 4 mm, it is recommendable to coat several wire-shaped steel elements simultaneously with an aluminium coating since the method according to the invention requires to apply a given minimum aluminium flow rate in order to obtain an aluminium coating layer which adheres well to the wire-shaped steel elements.

The invention also relates to a wire-shaped steel element coated with an aluminium coating layer characterized in that there is a free layer which protects the steel against corrosion and has a uniform thickness of 1–25 micron between the steel element and the aluminium coating layer, which carries at its inner surface a diffusion layer of iron and a protective layer and at its outer surface a diffusion layer of aluminium and a protective layer.

In the above description, aluminium does not only refer to aluminium but also to an alloy of aluminium.

The protective layer may consist of one metal, but also of an alloy offering the desired protection against corrosion.

Finally, the invention relates to an object of macro-molecular material, such as a plastic or an elastomer provided with wire-shaped elements according to the invention or obtained by use of the methodd according to the invention.

The invention will now be clarified by means of the exemplary embodiment and with reference to the drawing in which:

FIG. 1 is a cross-sectional view of a wire-shaped steel element according to the invention;

FIG. 2 is a sectional view of an apparatus for cladding a steel element with an aluminium coating;

FIG. 2a is a perspective view of a part of the wheel with the two applied grooves;

FIG. 3 is a variant of an apparatus for performing the process according to the invention.

FIG. 1 shows a steel wire 1 with a thickness of 1 to 8 mm, for example 6 mm. This steel wire 1 is provided with an electrolytically applied zinc layer 2 with a thickness of 5 microns.

At the outer side there is an aluminium coating 3 with a thickness of 1 mm.

The zinc layer 2 is diffused into the aluminium coating layer 3 and into the steel wire 1. However, this diffusion is limited to the very thin diffusion layers 2a and 2b.

FIG. 2 shows an apparatus for carrying out the method according to the invention, which apparatus as such is known. This apparatus comprises a wheel 12 provided with two grooves 13 extending over the entire circumference of the wheel 12.

A shoe member 4 acts in concert with the surface of the wheel 12 and the grooves 13. Each circumferential groove 13 contains an abutment 5 which fits to the shape of the cross-section of the groove 13 and is located at the underside of the shoe member 4 so that a groove 13 is closed in that place, but in such a way that when the wheel 12 is turning only a slight friction occurs between the groove 13 and said abutment 5. A sealing block 9 provided at the underside of the shoe member 4 and located at the end opposite the abutments 5 also projects into the circumferential grooves 13 of wheel 12 and, when the wheel 12 is turned relative to the sealing block 9, it closes off these grooves 13 under slight friction. Each of the grooves 13 is via a channel 6 in connection with a feed channel which is preferably made in the form of an expansion chamber 7 provided with an extrusion orifice 8.

On the other hand, each groove 13 is in connection with a feed aperture 14 for the aluminium cladding material 10.

A continuously fed steel wire 1 provided with a 4-micron-thick zinc coating 2 is passed through the extrusion orifice or bore 8.

Aluminium that is to be plastified is fed under pressure through the feed chamber 14 and fills the passageway 17 between the interior of the shoe member 4 and the walls of the grooves 13. By means of the rotation of the wheel 12 in the direction shown by the arrow 11, the aluminium 10 will be dragged along and plastified and subsequently pressed into the expansion chamber 7 via the channels 6 and subsequently pressed onto the steel wire 1 in the extrusion orifice 8.

An excellent aluminium coating on the steel wire 1 is obtained.

In a variant of the apparatus, shown in FIG. 2, for supplying the aluminium 10, the sealing blocks 9 in the grooves 13 and the feed chamber 14 are omitted and the aluminium 10 is fed continuously in the wire-form into the grooves 13 of the wheel 12 at the end of the shoe member 4 opposite to the abutment 5.

The thickness of the thus obtained aluminium-coated steel wire 1 can subsequently be reduced in a known manner by drawing the wire through a die.

FIG. 3 shows a part of an expansion chamber 7 containing a core member 15 in which two passages 8 are formed through which two steel wires can be passed. When using thin steel wires 1, it is recommendable to use such an apparatus since a given minimum flow rate of the aluminium in the expansion chamber 7 is always required.

EXAMPLE

A steel wire 1 with a diameter of 3 mm provided with an electrolytically applied zinc layer 2 having a thickness of 4 micron is, after being heated to 180° C., passed through an extrusion orifice 8 with a diameter of 4.8 mm at a speed of 70 m/min. Starting from two 10 mm-thick aluminium wires, the expansion chamber 7 is fed with plastified aluminium having a temperature of 385° C.

In view of the selected temperatures and speed, the temperatures of the aluminium 10 is insufficient to melt the zinc layer.

But diffusion of zinc into the steel and into the aluminium does occur, but this diffusion layer is very thin.

What is claimed is:
1. A method of cladding a steel wire with aluminum, the steps comprising:
    (a) first coating the steel wire with a layer of zinc having a thickness of between 1 and 25 microns;
    (b) then cladding the thus coated wire with aluminum by extruding plastified aluminum under pressure around the wire in an extrusion die while moving the wire through the die at a high speed sufficient to maintain the temperature of the zinc coating below its melting temperature; and
    (c) simultaneously while cladding, diffusing a portion of the zinc coating into the steel and aluminum.

2. A method as defined by claim 1 in which the thickness of said zinc coating is between 2 and 5 microns.

3. A method as defined by claim 1 in which the zinc coating step is performed electrolytically.

4. A method as defined by claim 1 in which the speed of movement of the coated steel wire through the extrusion die is between 50 and 400 meters per minute.

5. A method as defined by claim 1 in which the final product has an aluminum cladding layer between 1/10 and 3 millimeters thickness.

6. A method as defined by claim 1 in which a plurality of wires are clad simultaneously.

* * * * *